United States Patent
Racine

[19]

[11] Patent Number: 6,030,532
[45] Date of Patent: Feb. 29, 2000

[54] SOLID-LIQUID SEPARATOR AND FILTER

[75] Inventor: Jean-Pierre Racine, Granby, Canada

[73] Assignee: 9053-5998 Québec Inc., Granby, Canada

[21] Appl. No.: 09/018,794

[22] Filed: Feb. 4, 1998

[51] Int. Cl.[7] .................................................. B01D 24/32
[52] U.S. Cl. ...................... 210/360.1; 210/373; 210/369; 210/377; 210/330; 210/497.3; 209/208
[58] Field of Search ................................ 210/360.1, 373, 210/369, 377, 380.1, 396, 330; 209/208, 210, 725

[56] References Cited

U.S. PATENT DOCUMENTS

| | | | |
|---|---|---|---|
| 980,859 | 1/1911 | Atkins .................................. | 210/380.1 |
| 2,636,612 | 4/1953 | Cording et al. ......................... | 210/396 |
| 2,802,574 | 8/1957 | Schweppe . | |
| 3,226,257 | 12/1965 | Steele et al. ......................... | 210/380.1 |
| 3,283,910 | 11/1966 | Grieselhuber et al. . | |
| 3,403,785 | 10/1968 | Mercier . | |
| 4,137,176 | 1/1979 | Dudley et al. . | |
| 4,186,096 | 1/1980 | Areaux et al. ....................... | 210/380.1 |
| 4,253,960 | 3/1981 | Dudley et al. ....................... | 210/380.1 |
| 4,298,476 | 11/1981 | Dudley ................................... | 210/377 |
| 5,031,522 | 7/1991 | Brixel et al. . | |
| 5,114,489 | 5/1992 | Milner et al. . | |
| 5,264,124 | 11/1993 | Nemedi . | |
| 5,479,851 | 1/1996 | McClean et al. . | |

*Primary Examiner*—Donald P. Walsh
*Assistant Examiner*—Joe Dillon, Jr.
*Attorney, Agent, or Firm*—Francois Martineau

[57] ABSTRACT

This centrifugal apparatus comprises a primary frusto-conical filter screen rotating about a vertical axis, which is closed at its smaller diameter end and which is surrounded at its larger diameter upper end by a flat horizontal imperforate ring. A secondary cylindrical filter screen is fixed to and upstands from the periphery of the flat imperforate ring. The solid-liquid mixture is fed to the bottom of the primary filter screen and moves up under centrifugal force, the liquid being filtered and discharged into a surrounding casing. The solids move onto the ring and the liquid is further filtered through the secondary filter screen which retains the solids, being cylindrical. After the desired humidity content of the solids is reached, a scraper is lowered onto the ring to scrape the surface of the same and also the inner surface of the cylindrical secondary filter screen to remove the solids.

11 Claims, 5 Drawing Sheets

SOLID-LIQUID SEPARATOR AND FILTER

FIELD OF THE INVENTION

The present invention relates to a centrifugal apparatus for separating solids from liquids in a solid-liquid mixture. A specific application of the apparatus is to separate solids from the liquid in pig manure.

BACKGROUND OF THE INVENTION

Several types of centrifugal machines are known in which a frusto-conical, upwardly flaring, filter rotates about a vertical axis. The solid-liquid mixture is discharged at the bottom of the filter, the liquid is filtered out and the solids move upwardly under centrifugal force to be discharged at the top larger diameter rim of the filter; examples of such a system are described in U.S. Pat. No. 2,802,574, dated Aug. 13, 1957, inventor E. Schweppe, entitled "Centrifugal machine for extracting solids from liquids", in U.S. Pat. No. 3,283,910, dated Nov. 8, 1966, entitled "Centrifugal basket", inventors, W. Grieselhuber & al. In the above machines and others known to applicant, there is no system to control the degree of humidity of the solids discharged from the machine.

OBJECT OF THE INVENTION

It is therefore the main object of the present invention to provide a centrifugal apparatus for separating solids from liquids in a solid-liquid mixture which enables the operator to obtain solids with a selected degree of humidity.

Another object of the present invention is to provide an apparatus of the character described which is more particularly adapted for treating pig manure and other types of waste produced by the food industry.

Another object of the invention is to provide an apparatus of the character described which is of simple construction, easy to operate and is inexpensive to build.

SUMMARY OF THE INVENTION

This invention is a centrifugal apparatus for separating solids from liquids in a solid liquid mire. The apparatus comprises support means, a rotor supported by said support means for rotation about an upright axis, said rotor including an upwardly diverging frusto-conical primary filter screen, an imperforate ring surrounding and merging with the larger diameter upper end of said primary screen, a circular secondary filter screen coaxial with said primary screen, upstanding from said ring and radially outwardly located relative to said upper end of said primary screen, scraper means movably supported by said support means for movement between an operative scraping position in sliding and scraping contact with the top surface of said ring and with the inner surface of said secondary screen and an inoperative position clearing both said surfaces, and solids discharge means fixed to said support means and communicating with said scraper means to discharge to the outside of said apparatus solids scraped by said scraper means.

Preferably, said discharge means include an elongated discharge conduit generally horizontal, tangent to said secondary filter screen and overlying said secondary filter screen, said scraper means defining a scraper conduit generally tangent to and located radially inwardly of said secondary filter screen, having an outlet communicating with said discharge conduit, said scraper conduit further having an inlet, a bottom wall, and a radially outer side wall, said bottom wall and said radially outer side wall forming a first and a second scraping edge respectively at the inlet of said scraper conduit, said scraper conduit pivotally mounted at its outlet about a generally horizontal pivot axis for pivotal movement between said operative and said inoperative position, said bottom wall being upwardly inclined from said inlet to said outlet of said scraper conduit and having said first and second scraping edges in scraping and sliding engagement with said ring top face and with said secondary filter screen inner face respectively when said scraper conduit is in its operative position, said scraper conduit clearing the space above said ring and inwardly of said secondary filter screen and overlying said secondary filter screen when said scraper conduit is in its inoperative position.

Preferably, the secondary filter screen is cylindrical.

Preferably, the rotor further includes an imperforate cup shape member secured to and closing the smaller diameter lower end of said primary filter screen and further include an upright rotor shaft extending through said cup shape member, the latter and said primary screen being coaxial with said rotor shaft, said cup shape member having an upwardly flaring inner surface.

Preferably, the support means includes a casing having a side wall and a bottom wall said rotor shaft extending through said casing, said casing enclosing said rotor and further including a cover closing the top of said casing, said shaft being journaled in said cover and in said bottom wall, and further including securing means for securing said cover to said casing and for leveling said cover with respect to said casing, and further including power means todrive said rotor shaft.

Feeding means are provided for feeding a solid liquid mixture into said cup shape member, said feeding means including a tubular portion spacedly surrounding said shaft above said cup shape member and opening into said cup shape member, said tubular portion being secured to said cover and further including an inlet tube in communication with said tubular portion.

Preferably, said feeding means further include a helical rib surrounding and secured to said rotor shaft in the region thereof disposed within said tubular portion.

Preferably, said radially outer wall of said scraper conduit makes an included angle of less than 90 degrees with a radial line joining said upright axis with said second scraping edge when said scraper conduit is seen in top plan view.

Preferably, said cover has air inlet openings to admit air within said primary screen to ficilitate drying of the solids withing said primary screen.

Preferably, the apparatus further includes power means to pivot said scraper conduit between its operative and inoperative positions.

Preferably, said last named power means is a plunger actuated by an electromagnet.

BRIEF DESCRIPTION OF THE ENCLOSED DRAWINGS

DETAILED DESCRIPTION OF THE PREFERRED EMBODIMENT

Figure 1:
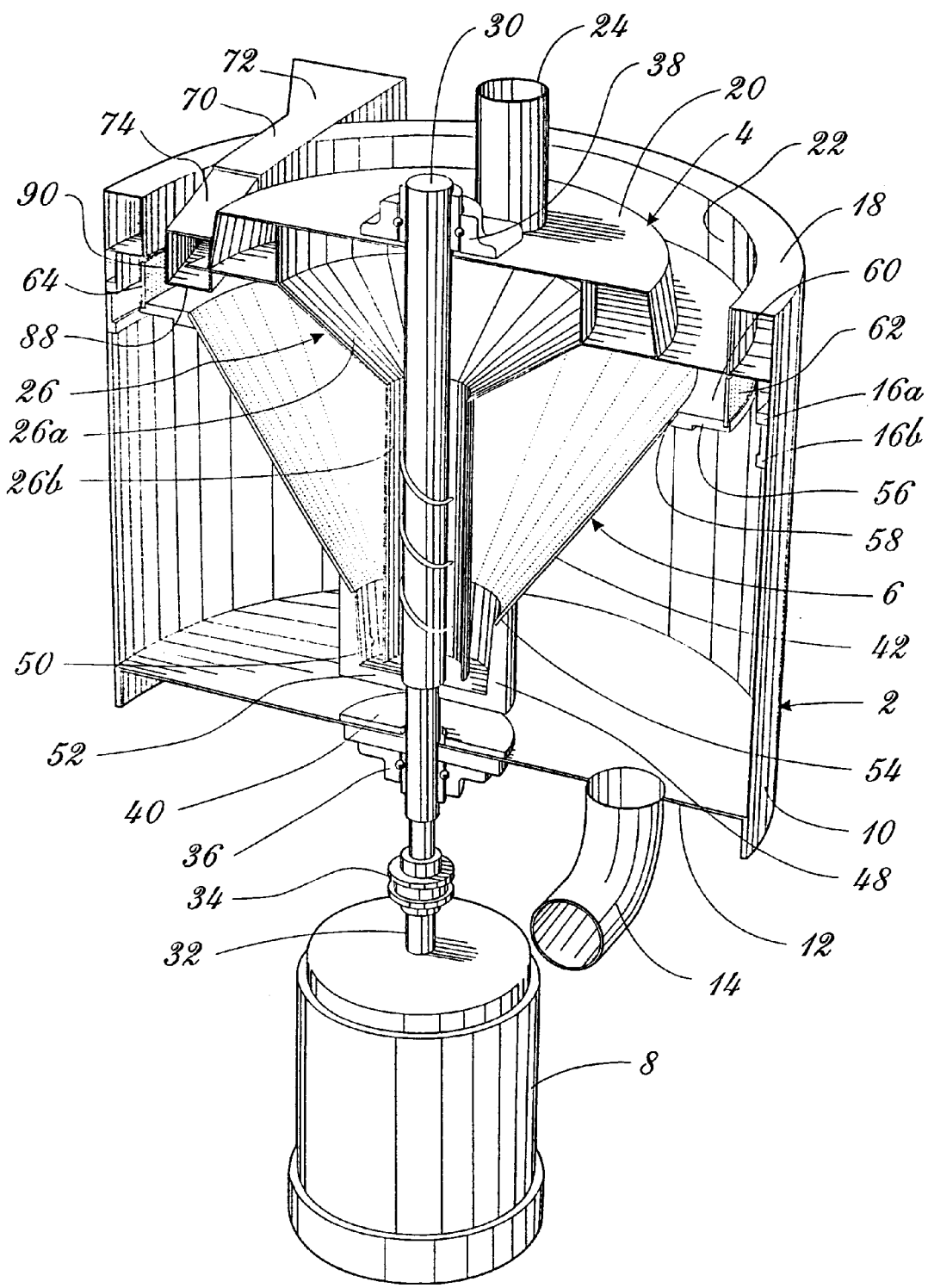
FIG. 1 is a cut-away perspective view of the centrifugal apparatus of the invention.

The centrifugal apparatus of the invention comprises a casing 2 supported by vertical legs 3, a cover 4 for the casing 2 and a rotor 6 located within casing 2. The rotor 6 is driven into rotation about a vertical axis by means of an electric motor 8 secured to the legs 3 by transverse bars 9. Casing 2 comprises a cylindrical side wall 10 and a bottom wall 12 with a liquid outlet tube 14.

The cover 4 includes a marginal portion 18, a central portion 20 and an intermediate trough portion 22. Marginal portion 18 is provided at its lower end with an upper ring 16a which is coaxial with a lower support ring 16b secured to the top edge of side wall 10 of casing 2. A series of bolts (not shown), are interposed between the two rings 16a, 16b all around casing 2 and serve to adjust the level of cover 4 with respect to casing 2. A solid-liquid inlet tube 24 is secured to the central portion 20 of the cover 4 and communicates with the top portion of a funnel 26 which is secured to cover 4 and extends downwardly therefrom, consisting of a top enlarged portion 26a and of a bottom tubular portion 26b. Cover 4 is further provided with air inlet openings 28.

Rotor 6 comprises a shaft 30 secured to the shaft 32 of electric motor 8 by a flexible coupling 34. The rotor shaft 30 extends through casing 2 being journaled in a bottom journal 36 carried by bottom wall 12 and in a top journal 38 carried by central portion 20 of cover 4. A rotary seal 40 carried by the casing bottom wall 12 surrounds shaft 30.

The rotor 6 further includes a primary filter 42 which is of generally frusto-conical shape and which flares upwardly being coaxial with vertical shaft 30. Primary filter screen 42 is composed of a fine mesh filter screen 44 surrounded by a perforated backing 46; filter screen 44 has, for instance a mesh size of 50 microns. A cup shape imperforate member 48 is secured to and closes the bottom of the primary filter 42; cup shape member 48 surrounds and is coaxial with shaft 32 and is secured thereto by its bottom wall 52.

Figure 2:
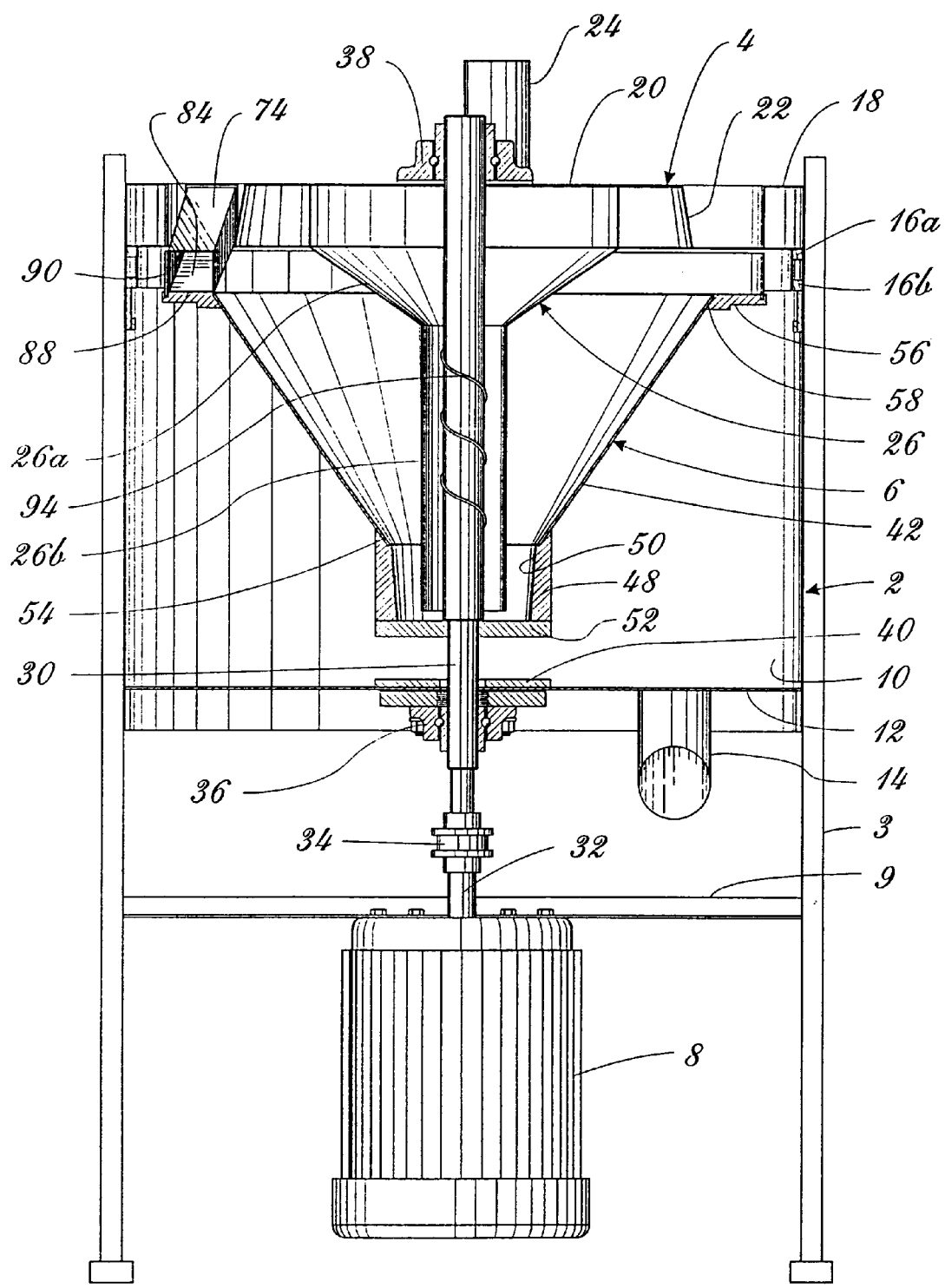
FIG. 2 is a vertical cross-section of the same.
Figure 3:
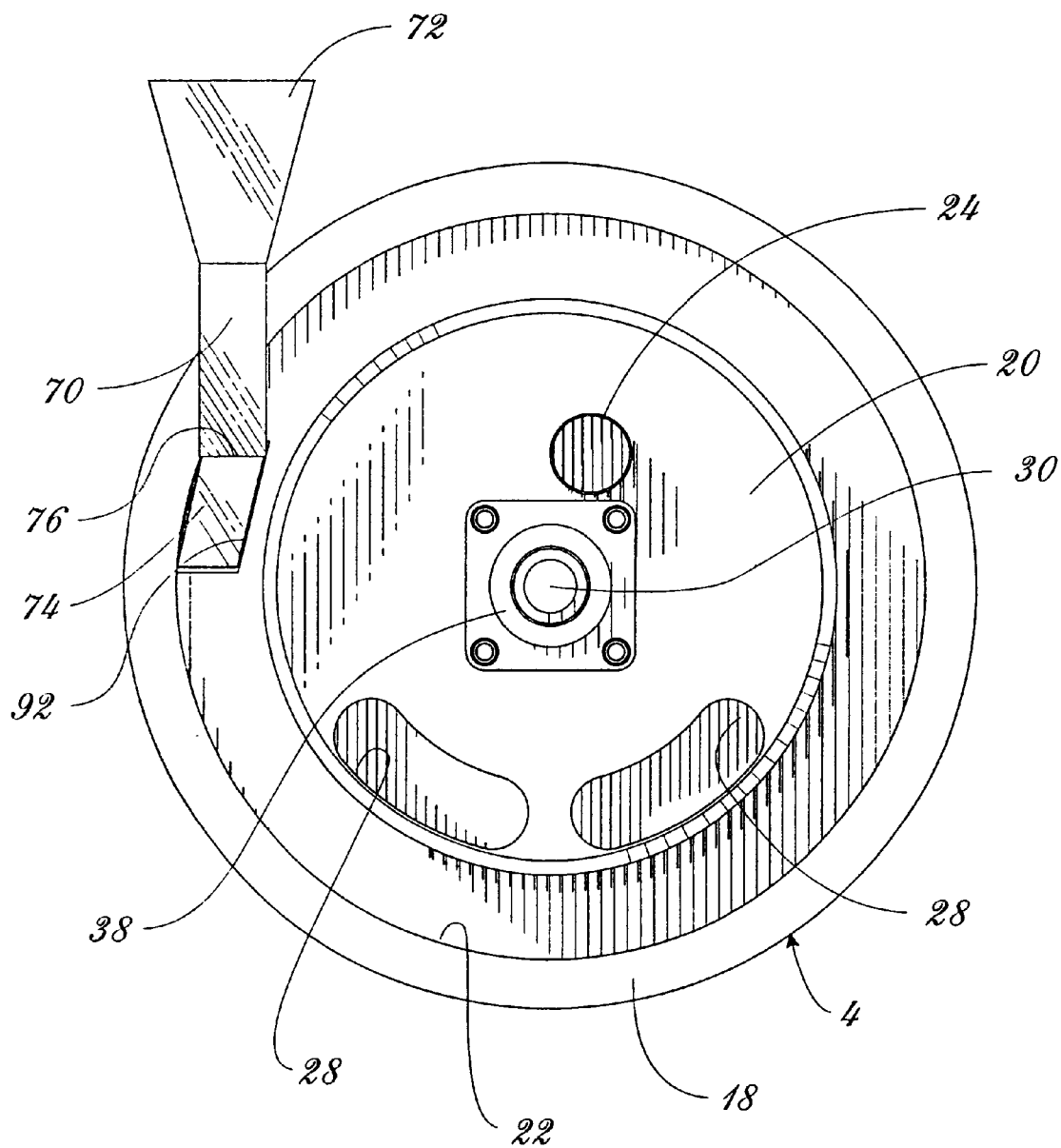
FIG. 3 is a top plan view of the apparatus.
Figure 4:
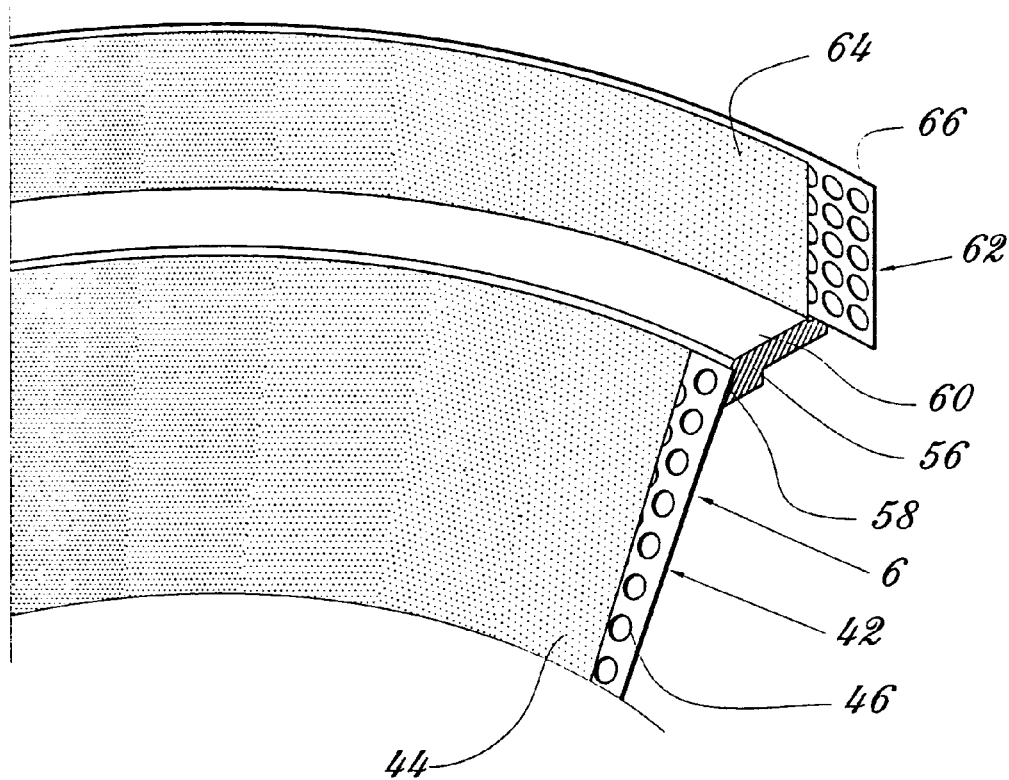
FIG. 4 is a partial perspective view showing the rotor assembly consisting of the primary filter, the imperforate top ring and the secondary filter.

Lower end 54 of backing 46 is secured to the top edge of the cup shape member 48. The inner face 50 of cup shape member 48 is slightly upwardly flaring as shown in FIG. 2.

The top larger diameter end of perforated backing 46 is secured to a flat imperforate ring 56 which surrounds the primary filter screen 42 and has a top horizontal surface 60.

A secondary filter 62 of generally cylindrical shape is secured to the marginal portion of imperforate ring 56 and is also composed of a fine mesh filter screen 64 with a surrounding perforated backing 66.

A discharge conduit 70 is fixed to cover 4, extends through marginal portion 18 into trough portion 22, and is tangent to and overlies secondary filter screen 62, being provided with an enlarged outlet 72; a scraper conduit 74 is pivoted to and communicates with the inlet of discharge conduit 70. Scraper conduit 74, when seen in top plan view, is located radially inwardly of screen 62. The pivotal connection of conduit 74 is indicated at 76 in FIG. 5, it is horizontal and the scraper conduit 74 is provided with an upwardly extending crank arm 78 to which is pivotally connected a plunger rod 80 of an electro-magnet 82 secured to cover 4.

Figure 5:
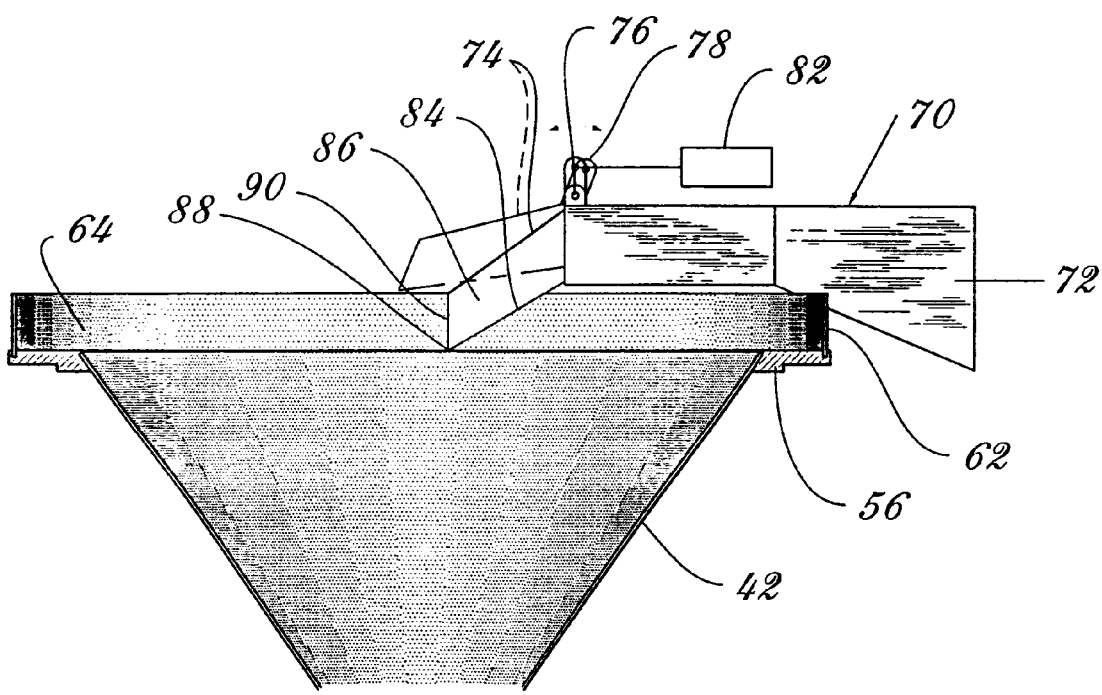
FIG. 5 is a vertical cross-section of the rotor assembly and of the scraper and discharge conduits, the scraper conduit being shown in full line operative and in dotted line inoperative position.

The scraper conduit 74 has a bottom wall 84 and an radially outer wall 86 forming at the inlet of the scraper conduit a bottom scraping edge 88 and a radially outer scraping edge 90. Outer wall 86 makes an included angle of less than 90 degrees with a radial line joining the axis of rotor shaft 30 with outer scraping edge 90. As shown in FIG. 5, scraper conduit 74 can take an operative position under the action of the electro-magnet 82 in which its bottom wall 84 is downwardly inclined with the scraping edges 88 and 90 in respective scraping engagement with the top face of imperforate ring 56 and with the radially inner surface of the fine mesh filter screen 64 of the secondary filter 62.

Upon action of the electro-magnet 82, the scraper conduit is pivotally raised to an elevated inoperative position in which the inlet end of the scraper conduit is disposed above the top edge of the rotating secondary filter 62 so as to clear the same. The scraper conduit 74 freely extends through a cover opening 92.

A helical rib 94 is secured to and surrounds rotor shaft 30 in the portion thereof surrounded by the lower tubular portion 26b of funnel 26. Preferably, rotor 6 is provided with a heating system (not shown) to cause melting of any fats in the mixture which might clog the filters 42 and 62.

The apparatus of the invention operates as follows:

Scraper conduit 74 is in raised inoperative position.

The rotor 6 is rotated by motor 8 at a selected speed, the solid-liquid mixture is fed through inlet tube 24 into the funnel 26 and falls into the bottom of cup shape member 48. Rib 94 serves to positively feed the mixture and avoids any clogging within funnel 26. The mixture is further pulverised within the cup shape member and under centrifugal force moves upwardly against the upwardly flared wall 50 until it reaches the primary filter. Due to the conicity of the latter, the solids move upwardly along the inner surface of the primary filter 42 while the liquid is filtered out and falls within casing 2 to be discharged through outlet tube 14. The solids move over the ring 56 force and are pushed against the inner surface of the secondary filter; the latter being upright, the solids accumulate against the secondary filter 62. After a certain number of revolutions, the scraper conduit 74 is lowered to its operative position to scrape the solids and discharge the same to the exterior through the discharge conduit 70. The scraper edges 88 and 90 scrape the ring top surface and the inner surface of the secondary filter respectively. It will be noted that the additional rotation of the solids against the secondary filter is sufficient to considerably decrease the humidity content of the solids, so much so that the centrifugal force at the secondary filter is greater than at the top edge of the primary filter, the centrifugal force being porportional not only to the square of the rotational speed of, but also to the radial distance from the rotational axis.

A sample of pig manure containing 10 per cent solids was supplied at a rate of 600 gallons per hour to an apparatus of the invention in which the rotor of a 32 inches external diameter was rotated at 900 Rpm to obtain a centrifugal force at the secondary filter of about 910 g. The conicity of the primary filter was 35 degrees. 100 microns filter screen mesh was used. A Venturi effect was produced causing air to enter into filter 42 through air openings 28 to further aid in the drying of the solids. The liquid was filtered out and after only a few further rotations of the solids within the space enclosed by the secondary filter, the humidity content of said solids was reduced to about 50 per cent. Filter plugging was completely eliminated by induction heating of the primary filter to obtain a 90 degree centigrade temperature, sufficient to melt the fat contents of the manure. The discharged manure solids with a 50 per cent humidity content were suitable for burning or for use as a fertilizer to be spread directly on fields since they do not have any bad odour. The liquid collected was further treated to obtain pure water with the disolved ingredients being recuperated and disposed of. A suitable secondary treatment of the collected liquid was filtration through sand or ultra-filtration with ozone treatment or reverse osmosis.

It has been found that the apparatus of the invention can be used to filter out not only pig manure but all kinds of organic matter containing waste. The rotational speed of rotor 6 can be increased up to about 3000 Rpm to obtain a centrifugal force of about 3000 g depending on the mixture to be filtered.

I claim:

1. A centrifugal apparatus for separating solids from liquids in a solid liquid mixture comprising support means, a rotor supported by said support means for rotation about an upright axis, said rotor including an upwardly diverging frusto-conical primary filter screen, an imperforate ring surrounding and merging with the larger diameter upper end of said primary screen, a cylindrical secondary filter screen coaxial with said primary screen, upstanding from said ring and radially outwardly located relative to said upper end of said primary screen, scraper means movably supported by said support means for movement between an operative scraping position in sliding and scraping contact with the top surface of said ring and with the inner surface of said secondary screen and an inoperative position clearing both said surfaces, and solids discharge means fixed to said support means and communicating with said scraper means to discharge to the outside of said apparatus solids scraped by said scraper means.

2. A centrifugal apparatus as defined in claim 1, wherein said discharge means include an elongated discharge conduit generally horizontal, tangent to said secondary filter screen and overlying said secondary filter screen, said scraper means defining a scraper conduit generally tangent to and located radially inwardly of said secondary filter screen, having an outlet communicating with said discharge conduit, said scraper conduit further having an inlet, a bottom wall, and a radially outer side wall said bottom wall and said radially outer side wall forming a first and a second scraping edge respectively at the inlet of said scraper conduit, said scraper conduit pivotally mounted at its outlet about a generally horizontal pivot axis for pivotal movement between said operative and said inoperative position, said bottom wall being upwardly inclined from said inlet to said outlet of said scraper conduit and having said first and second scraping edges in scraping and sliding engagement with a top face of said ring and with said secondary filter screen inner face respectively when said scraper conduit is in its operative position, said scraper conduit clearing a space above said ring and inwardly of said secondary filter screen and overlying said secondary filter screen when said scraper conduit is in its inoperative position.

3. A centrifugal apparatus as defined in claim 2, wherein said radially outer wall of said scraper conduit makes an included angle of less than 90 degrees with a radial line joining said upright axis with said second scraping edge when said scraper conduit is seen in top plan view.

4. A centrifugal apparatus as defined in claim 1, further including power means to pivot said scraper conduit between its operative and inoperative positions.

5. A centrifugal apparatus as defined in claim 4, wherein said last named power means is a plunger actuated by electromagnet.

6. A centrifugal apparatus as defined in claim 1, wherein said rotor further includes an imperforate cup shape member secured to and closing the smaller diameter lower end of said primary filter screen and further include an upright rotor shaft extending through said cup shape member, the latter and said primary screen being coaxial with said rotor shaft, said cup shape member having an upwardly flaring inner surface.

7. A centrifugal apparatus as defined in claim 6, wherein said secondary filter screen is cylindrical.

8. A centrifugal apparatus as defined in claim 6, wherein said support means includes a casing having a side wall and a bottom wall, said rotor shaft extending through said casing, said casing enclosing said rotor and further including a cover closing the top of said casing, said shaft being journaled in said cover and in said bottom wall, and further including securing means for securing said cover to said casing and for leveling said cover with respect to said casing, and further including power means to drive said rotor shaft.

9. A centrifugal apparatus as defined in claim 8, wherein said cover has air inlet openings to admit air within said primary screen to facilitate drying of the solids within said primary screen.

10. A centrifugal apparatus as defined in claim 8, furhter including means for feeding a solid liquid mixture into said cup shape member, said feeding means including a tubular portion spacedly surrounding said shaft above said cup shape member and opening into said cup shape member, said tubular portion being secured to said cover and further including an inlet tube in communication with said tubular portion.

11. A centrifugal apparatus as defined in claim 10, wherein said feeding means further include a helical rib surrounding and secured to said rotor shaft in the region thereof disposed within said tubular portion.

* * * * *